United States Patent
Freadman

(10) Patent No.: US 6,263,381 B1
(45) Date of Patent: Jul. 17, 2001

(54) PRECONDITIONING SYSTEM FOR FACILITATING SWITCHING BETWEEN ELECTRONIC DEVICES USING AUTOMATIC PERIPHERAL CONNECTION BUTTON TO DOWNLOAD PREDETERMINED SOFTWARE/ PARAMETERS AND AUTOMATICALLY ACTIVATING MICROPHONE AND PLURALITY OF SPEAKERS

(76) Inventor: Tommyca Freadman, 16 Glen Dr., Goshen, NY (US) 10924

( * ) Notice: Subject to any disclaimer, the term of this patent is extended or adjusted under 35 U.S.C. 154(b) by 0 days.

(21) Appl. No.: 09/191,742

(22) Filed: Nov. 13, 1998

(51) Int. Cl.[7] .............................. G06F 13/14; G06F 13/20
(52) U.S. Cl. .................................. 710/8; 710/10; 710/15; 710/18
(58) Field of Search ............................... 710/1, 8, 10, 15, 710/18

(56) References Cited

U.S. PATENT DOCUMENTS 5,428,748 * 6/1995 Davidson et al. .................... 395/275
5,548,782 * 8/1996 Michael et al. ...................... 395/835
5,752,232 * 5/1998 Basore et al. ........................ 704/275

* cited by examiner

Primary Examiner—Thomas C. Lee
Assistant Examiner—Rehana Perveen

(57) ABSTRACT

The present invention provides an automatic preconditioning connection device and method for automatically optimizing and coupling a selected external peripheral device to a computer. The automatic preconditioning connection device is coupled, either directly or in daisy-chain fashion, to a plurality of external peripheral devices and also is coupled to the computer. The automatic preconditioning device includes a plurality of automatic peripheral preconditioning buttons that launch, optimize and control at least one external peripheral device selected from a plurality of external peripheral devices by automatically configuring a programmable digital signal processor or processor using predetermined software or predetermined parameters that are downloaded from the computer upon activation of the selected launch button and activating a graphic user interface of the computer. The device and method may include, upon activation of a selected launch button and automatic downloading of predetermined software or parameters, the optimized use of a microphone for voice recognition operation or voice control of the selected peripheral.

11 Claims, 5 Drawing Sheets

PRECONDITIONING SYSTEM FOR FACILITATING SWITCHING BETWEEN ELECTRONIC DEVICES USING AUTOMATIC PERIPHERAL CONNECTION BUTTON TO DOWNLOAD PREDETERMINED SOFTWARE/ PARAMETERS AND AUTOMATICALLY ACTIVATING MICROPHONE AND PLURALITY OF SPEAKERS

BACKGROUND OF THE INVENTION

1. Field of the Invention

This invention relates to a method and apparatus for facilitating switching computer connections between electronic peripheral devices, and more specifically, a method and apparatus for preconditioning and switching electronic peripheral device-computer connections wherein dedicated launch buttons automate the preconditioning and the switching.

2. Description of the Related Art

Conventional phone, e-mail devices, internet systems, electronic address systems, handheld computing devices, personal digital assistants, printers, video conferencing systems, and the like have each typically been connected to a computer by one of a myriad of serial and parallel port connection cords. To connect a particular external device/ system, the user was required to connect the particular connection cord, such as a parallel connection RS232 for a printer, to the corresponding port on the computer, and then the user needed to run a set-up program to initialize the external device/system.

In some instances, an infrared connection has been established between the computer and the external peripheral device/system, but since most computers have only one infrared connection port, each time an external peripheral device needed to be utilized with the computer, any previously connected infrared connection peripheral device had to be moved, and the new peripheral device had to be positioned in proximity to the infrared port and initialized. Also, since more extensive error correction is needed for infrared connections than for direct electrical connections, using infrared connections for peripheral devices is typically more expensive than simply using a direct connection cord. Thus, many electronic peripheral devices that couple to computers do not include infrared connection capability.

The introduction of the Universal Serial Bus (USB) has facilitated connections of peripheral devices, since the USB replaces all the different kinds of serial and parallel port connectors with one standardized plug and port combination for computers having USB compatible ports. USB- compliant computers and peripherals may simply be connected with electrical cords having USB connections. The USB eliminates the need to use add-in cards to the computer and also does away with having to reset DIP (dual in-line package) switches or IRQs (interrupt request settings). The USB connection allows the user to attach or remove a peripheral device without turning off the computer and restarting it. The USB also permits multiple USB connections, either by using multiple USB ports on the computer or by daisy-chaining a plurality of peripheral devices and connecting the daisy-chain to the computer. When the USB is connected to a plurality of peripheral devices, the USB connector "senses" the power needed and distributes the required power without the need for a separate power supply attachment.

Thus, there is a need for a method and device to facilitate preconditioned, computer connection to a selected peripheral device of a plurality of peripheral devices.

SUMMARY OF THE INVENTION

The present invention provides an automatic preconditioning connection device and method that utilize a graphic user interface (GUI) for facilitating coupling of a selected external peripheral device to a computer. The device is coupled to a plurality of external peripheral devices and to a computer. The plurality of external peripheral devices may be daisy-chained or may be individually coupled to the automatic preconditioning connection device.

The invention facilitates quick connection of the selected external peripheral device with the computer. The automatic preconditioning device generally includes a housing on which are mounted a plurality of automatic peripheral preconditioning connection buttons. Each button is typically a hot launch button for controlling and optimizing an external peripheral device selected from a plurality of external peripheral devices.

The present invention facilitates the use of the hot launch buttons for downloading, automatically, predetermined conditioning software or predetermined conditioning parameters associated with a particular hot launch/connection button by activating a graphical user interface of the computer that enables a user, for example, to quickly select participants for a telephone or video conference. The preconditioning software or parameters optimize the operation of the programmable digital signal processor (DSP) or another processor with respect to the selected external peripheral device and optimize the microphone and speakers of the invention for the selected function. The hot launch buttons are coupled to the programmable DSP or processor, which in turn is coupled to at least a first port for the automatic preconditioning device. Though in the preferred embodiment, the port is USB compliant, clearly the at least first port may also be a serial or parallel configuration port. The external peripheral devices are either coupled individually to ports of the automatic preconditioning device, or are daisy-chained and then connected to the port of the automatic preconditioning device.

For example, if video conferencing is selected, the video camera and audio system are automatically configured to preselected optimized configurations, and a central address hot launch button is utilized to connect video conferencing participants (described in more detail below), automatically activating the selected activity.

In a preferred embodiment, the automatic preconditioning connection device includes a plurality of speakers that are coupled to receive input from the computer and/or the external peripheral devices.

In one embodiment, along a middle portion of the housing, a top portion of the housing is configured to include a catch-cup that fits into a catch-cup well on a bottom portion of the housing, facilitating attachment of the top portion of the housing to the bottom portion of the housing.

In a preferred embodiment, a microphone is operably coupled to the programmable DSP or processor and to at least the first port and is located adjacent to a plurality of parallel, elongated openings in the housing. The microphone is housed in an acoustical lens such that sound waves from a prespecified direction are amplified. For voice recognition operation, upon activation, the microphone automatically downloads predetermined voice recognition software or preselected parameters corresponding to a selected peripheral connection button to facilitate voice activation or control of the associated peripheral device or devices.

The method of the present invention corresponds to the operation of the automatic preconditioning connection device.

Other features and advantages of the present invention will become apparent from the following description of the preferred embodiments of the present invention which are shown in the accompanying drawings.

DETAILED DESCRIPTION OF PREFERRED EMBODIMENTS

Figure 1:
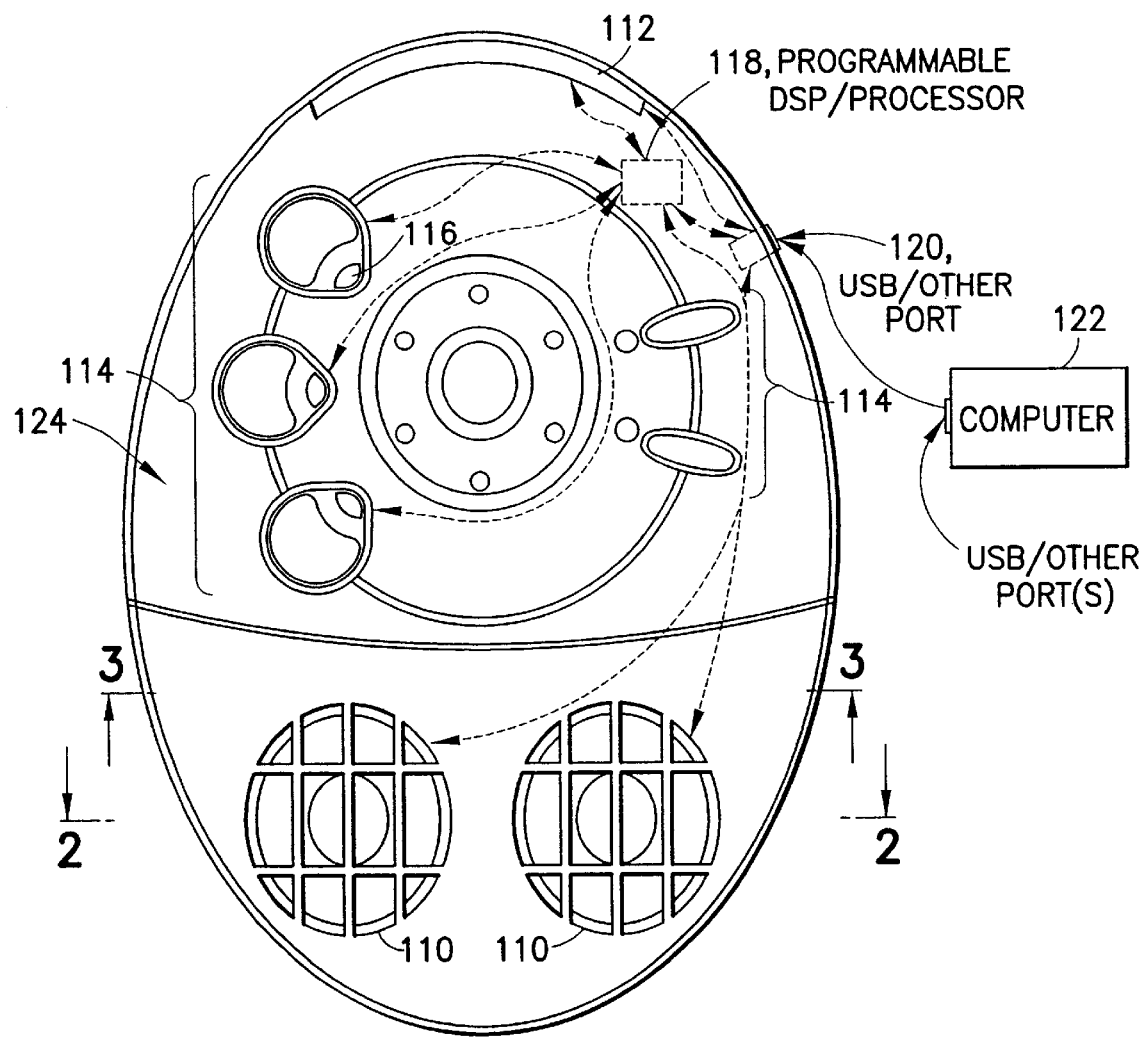
FIG. 1 is a front schematic view of a preferred embodiment of a device in accordance with the present invention.

In the front schematic view, shown in FIG. 1, of a preferred embodiment of a device of the present invention, the device is an automatic preconditioning device that includes at least a first USB compatible port 120 for USB bus connection to USB ports of a computer 122. Alternatively, serial and/or parallel port connections 120 may also be utilized for the device of the present invention and for the computer 122. Also, in a preferred embodiment the present invention provides a plurality of control buttons ("hot launch buttons") 114 conveniently located on the top of the housing 124 to provide control by tactile manipulation. Where selected, an LED (a light-emitting diode) 116 may be utilized to indicate visually that a particular "hot launch button" has been activated. A plurality of speakers 110 are coupled, as is known in the art, to receive audio output from the computer 122 and/or external peripheral devices, as selected. A microphone 112 is located at the periphery of the device to provide for, as is known in the art, voice input. However, in the present invention, upon activation of an associated hot launch button and downloading of the associated software or predetermined parameters to the programmable DSP or processor, the microphone 112 is optimized for the selected hot launch button activity. As will be clear from the description below, a hot launch button may also be designated an "automatic peripheral preconditioning connection button" or, alternatively, "at least a first automatic peripheral connection/graphic user interface activation button".

Figure 2:
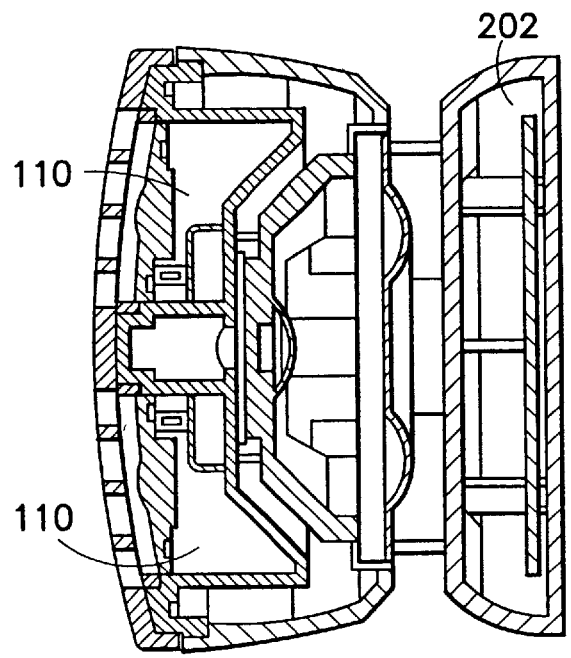
FIG. 2 is a cross-sectional view taken at line S—S of FIG. 1.

FIG. 2 is a cross-sectional view taken at line S—S of FIG. 1. This figure shows a cross-sectional view of a preferred embodiment of the two upper speakers 110 shown in FIG. 1. In a preferred embodiment, the third speaker 202 is located in the base of the device. In one embodiment, the two upper speakers 110 are typically used for high frequency output, and the third speaker 202 is generally used for lower frequency output.

Figure 3:
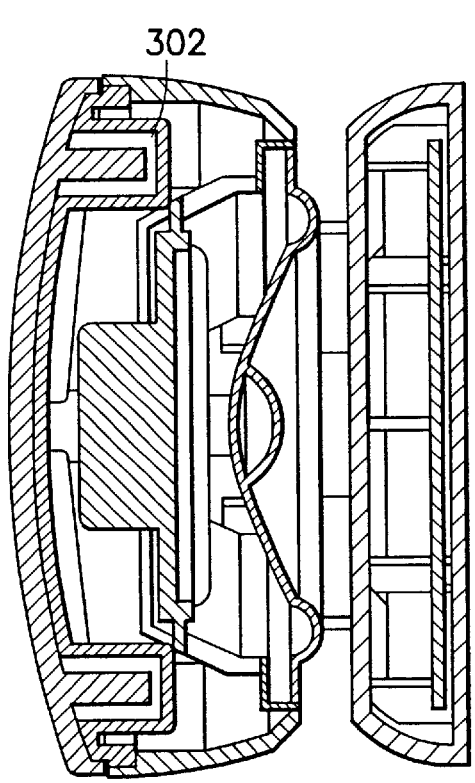
FIG. 3 is a cross-sectional view taken at line R—R of FIG. 1.

FIG. 3 is a cross-sectional view taken at line R—R of FIG. 1. A well 302 for catch-cups is located on a bottom portion of the automatic preconditioning device to facilitate engagement of the top portion of the device with the bottom portion of the device.

Figure 4:
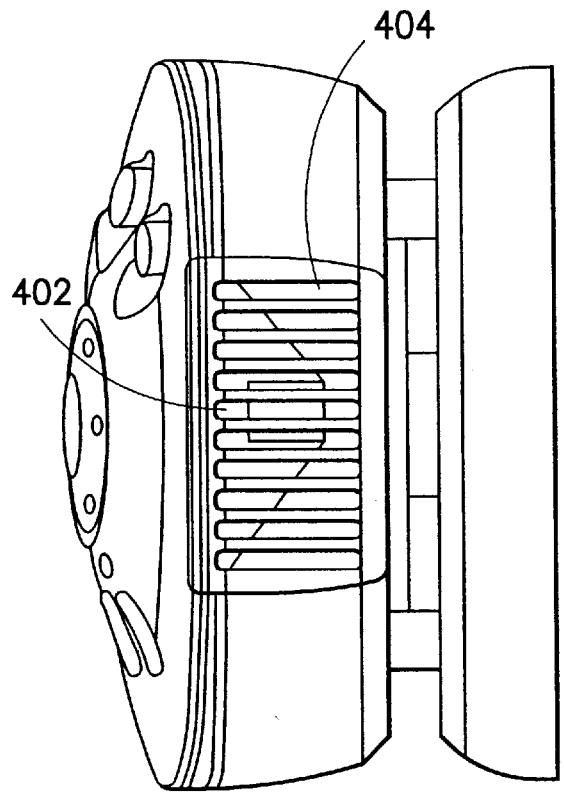
FIG. 4 is cross-sectional view taken at line C—C of FIG. 1.

FIG. 4 is a cross-sectional view taken at line C—C of FIG. 1. In a preferred embodiment, a microphone 402 is located proximate to a plurality of thin, vertical openings 404 and is housed in an acoustical lens to amplify sound waves received from a predetermined direction, providing a megaphone-like effect. The vertical openings aid the transmission of sound from the microphone to the environment outside the device. Upon activation of the microphone 402 by downloading, from the computer, predetermined software or parameters to the programmable DSP or processor when a selected launch button is activated, the microphone 402 may be optimally configured to control the external peripheral device/devices using a preselected voice recognition technique.

Figure 5:
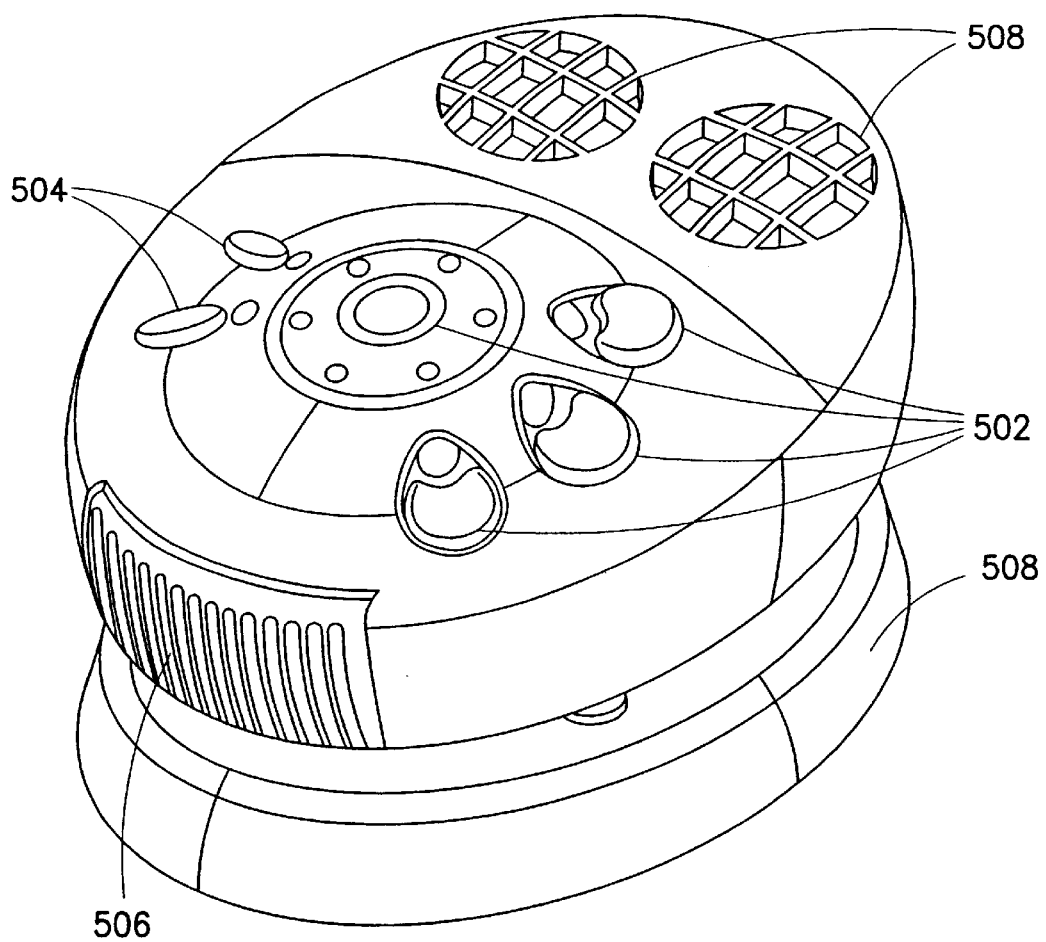
FIG. 5 is a perspective view of a preferred embodiment of a device in accordance with the present invention.

FIG. 5 is a top view of a preferred embodiment of a device in accordance with the present invention. This embodiment illustrates the implementation of four hot launch buttons 502, two control function buttons 504, a microphone 506, and three speakers 508. The programmable DSP (inside) and the port are not shown, the port being on the back side of the device.

Figure 6:
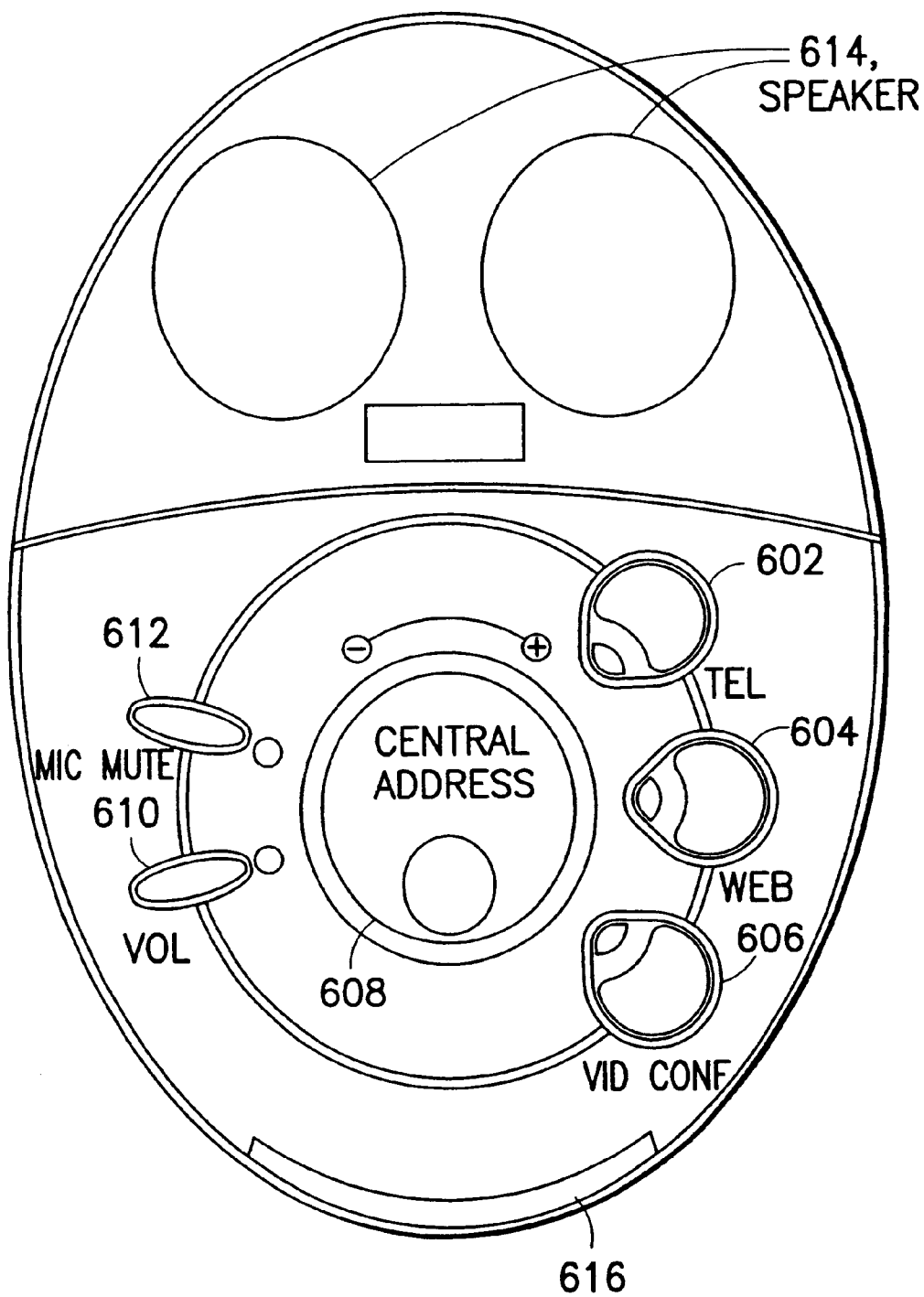
FIG. 6 is a top view of a preferred embodiment of a device in accordance with the present invention, showing exemplary functions for "hot buttons".

FIG. 6 is a top view of a preferred embodiment of a device in accordance with the present invention, showing exemplary functions for "hot launch buttons". In this preferred embodiment, the device utilizes four hot launch buttons: a hot launch button 602 for telephone connection, a hot launch button for internet connections (Web) 604, a hot launch button for video conferencing (Vid Conf) 606, and a hot launch button for accessing a central address system 608. The hot launch buttons are operably coupled to a programmable digital signal processor (DSP)/processor (not shown) such that, upon activation of a selected hot launch button, predetermined software or predetermined parameters corresponding to the selected hot launch button is/are downloaded from the computer (not shown). In a preferred embodiment, a T18081 DSP is typically utilized. The predetermined software or predetermined parameters automatically condition, i.e., program, the digital signal processor/processor to perform the specific function of the selected hot launch button in an optimized fashion. Typically, the programmable digital signal processor/processor optimizes and activates (conditions) a microphone and plurality of speakers of the automatic preconditioning connection device. In addition, a graphic user interface is activated on the computer. For example, the GUI may be selected to show a scrolling telephone list or a list of faces, which may be utilized for selection of telephone/video conference participants.

In a preferred embodiment there are three speakers, the third speaker being located below the two top speakers (see FIG. 6). The central address control button 608 provides an additional function when correlated with either the Mic Mute 612 or the Vol 610 button or alternatively, with any of the Telephone (Tel) 602, Web 604, or Video Conference (Vid Conf) 606 buttons. When either the Mic Mute 612 or the Vol 610 button is activated, predetermined software or predetermined parameters are downloaded automatically to the DSP or processor automatically opening a graphic user interface on the computer screen (not shown) showing a volume scale, automatically optimizing and configuring the device of the invention. The central address control button 608 functions as a microphone volume or a speaker volume control, respectively, i.e., the volume is controlled by rotation of the button 608.

When any of the Tel 602, Web 604, or Vid Conf 606 buttons is pressed, the predetermined software or predetermined parameters are automatically downloaded to the DSP or processor, the graphic user interface is activated on the computer, and the central address control button 608 functions as an address/phone number retriever. That is, for each person to be included in the telephone conference or video conference, the central address control button 608 may be rotated clockwise or counterclockwise to obtain (as indicated on the computer screen) the desired address, phone number, or the face of the selected person, and then the central address control button is pressed to include the selected person automatically using the selected address, phone number or face of the desired individual. Typically, the preselected software or preselected parameters include a default setting that defaults to a standby mode after a predetermined number of seconds of inactivity. For example, in a preferred embodiment, after three seconds of non-rotation of the central address control button 608, the central address control button automatically enters a standby mode. Thus, in a preferred embodiment the volume control button 610 and the microphone mute button 612 function in conjunction with the central address control button 608 that is operably coupled to a programmable digital signal processor/processor (not shown in FIG. 6—see FIG. 1).

The microphone 616 is muted upon pressing the mute button (Mic Mute) 612. To unmute, the mute button 612 is typically pressed again.

It is clear that the hot launch buttons and the volume and mute control buttons may be simply tactile switches, depression switches or any other suitable switch that is activated by touch or by pressing on the switch.

In another preferred embodiment the automatic preconditioning connection device, is again coupled to a plurality of peripheral devices and to a computer, for facilitating quick, optimized connection, with the computer, of a selected peripheral device from the plurality of peripheral devices. The device includes: A) at least a first automatic peripheral connection/graphic user interface activation button (114) for downloading, automatically, predetermined optimizing software/parameters to a programmable digital signal processor/processor of the automatic preconditioning connection device and activating a graphic user interface of the computer; and B) the programmable digital signal processor/processor (118), coupled to the automatic peripheral connection/graphic user interface activation button and the computer, for automatically optimizing and activating a microphone and a plurality of speakers of the automatic preconditioning connection device in accordance with a predetermined function of the automatic peripheral connection/graphic user interface activation button.

As in the above embodiment, the automatic preconditioning connection device, the plurality of peripheral devices and the computer each typically include at least a first port that is universal serial bus compliant.

Where selected, the automatic peripheral connection/graphic user interface activation button automatically downloads predetermined voice recognition software/parameters to facilitate and optimize voice activation/control of an associated peripheral device.

Figure 7:
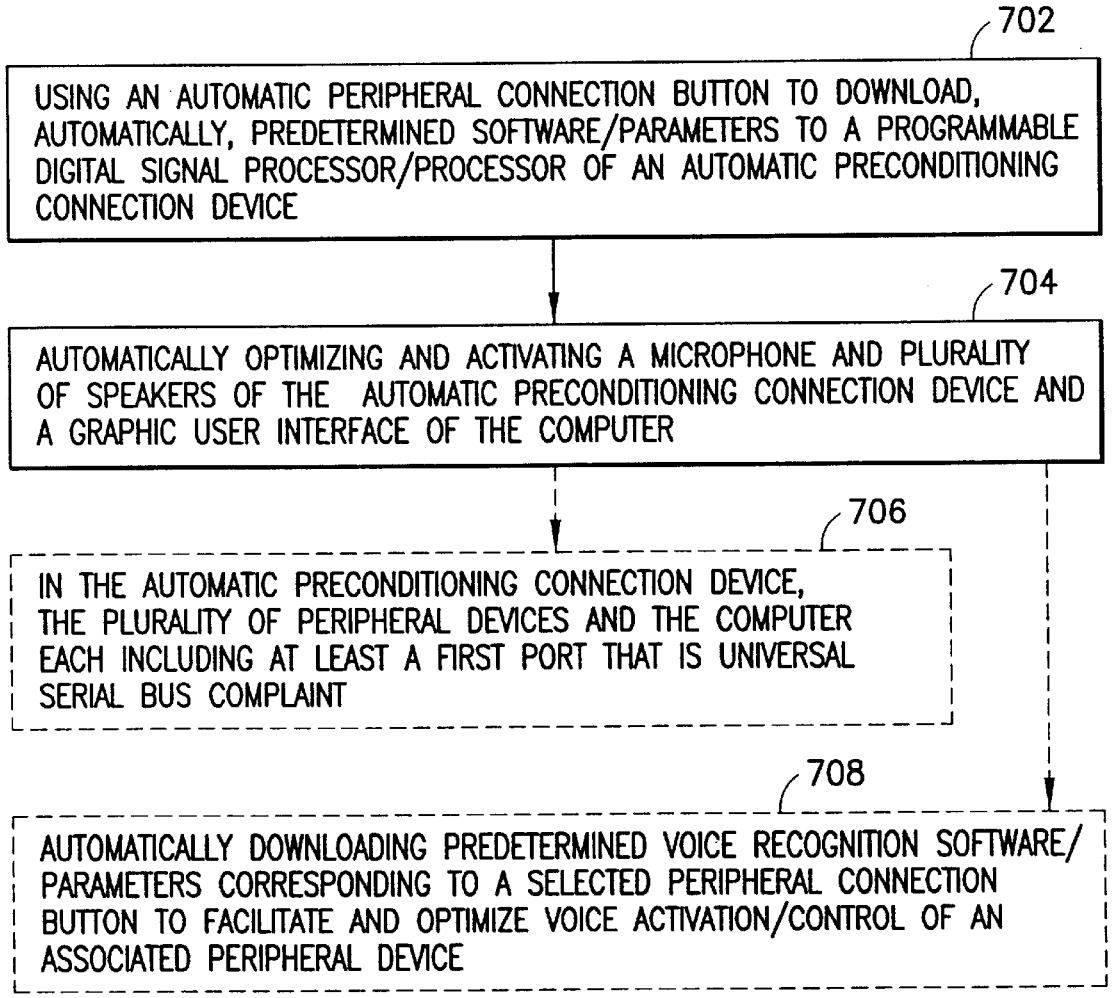
FIG. 7 is a flow chart showing one embodiment of steps in accordance with the method of the present invention.

One embodiment of steps in accordance with the method of the present invention is shown in FIG. 7. The method utilizes an automatic preconditioning connection device coupled to a plurality of peripheral devices and to a computer, for facilitating quick connection, with the computer, of a selected peripheral device from the plurality of peripheral devices. The method typically includes the steps of: A) using (702) an automatic peripheral connection button to download, automatically, predetermined software/parameters to a programmable digital signal processor/processor of the automatic preconditioning connection device, and B) automatically (704) optimizing and activating a microphone and plurality of speakers of the automatic preconditioning connection device and a graphic user interface of the computer.

In a preferred embodiment, the automatic preconditioning connection device, the plurality of peripheral devices and the computer each include (706) at least a first port that is universal serial bus compliant. In one embodiment the method may further include (708) automatically downloading predetermined voice recognition software/parameters corresponding to a selected peripheral connection button to facilitate and optimize voice activation/control of an associated peripheral device.

Although the present invention has been described in relation to particular preferred embodiments thereof, many variations and modifications and other uses will become apparent to those skilled in the art. It is preferred, therefore, that the present invention be limited not by the specific disclosure herein, but only by the appended claims.

What is claimed is:

1. An automatic preconditioning connection device coupled to a plurality of peripheral devices and to a computer, for facilitating quick, optimized connection, with the computer, of a selected peripheral device from the plurality of peripheral devices, the automatic preconditioning connection device comprising a housing on which are mounted a plurality of automatic peripheral preconditioning connection buttons, each automatic peripheral preconditioning connection button for controlling a peripheral device of the plurality of peripheral devices, wherein the automatic peripheral preconditioning connection buttons are coupled to a programmable digital signal processor/processor and to at least a first port of the automatic preconditioning connection device and the at least first port is utilized to couple the automatic preconditioning connection device to the plurality of peripheral devices and to the computer, and wherein, upon activation of a selected automatic peripheral connection button, predetermined software/parameters corresponding to the automatic peripheral connection button is/are automatically downloaded from the computer to the programmable digital signal processor/processor to optimize and activate a microphone and plurality of speakers of the automatic preconditioning connection device, and a graphic user interface is activated on the computer.

2. The automatic connection device of claim 1 further including a plurality of speakers coupled to receive input from at least one of: the computer and the peripheral devices.

3. The automatic connection device of claim 1 wherein the at least first port is universal serial bus compliant.

4. The automatic connection device of claim 1 wherein, along a middle portion of the housing, a top portion of the housing is configured to include a catch-cup that fits into a catch-cup well on a bottom portion of the housing.

5. The automatic connection device of claim 1 further including a microphone, operably coupled to the programmable digital signal processor/processor and to at least the first port, located adjacent to a plurality of parallel, elongated openings in the housing, for, upon activation, automatically downloading predetermined voice recognition software/parameters corresponding to a selected peripheral connection button to facilitate and optimize voice activation/control of the associated peripheral device.

6. An automatic preconditioning connection device coupled to a plurality of peripheral devices and to a computer, for facilitating quick, optimized connection, with the computer, of a selected peripheral device from the plurality of peripheral devices, the device comprising:

A) at least a first automatic peripheral connection/graphic user interface activation button for downloading, automatically, predetermined optimizing software/parameters to a programmable digital signal processor/processor of the automatic preconditioning connection device and activating a graphic user interface of the computer;

B) the programmable digital signal processor/processor, coupled to the automatic peripheral connection/graphic user interface activation button and the computer, for automatically optimizing and activating a microphone and a plurality of speakers of the automatic preconditioning connection device in accordance with a predetermined function of the automatic peripheral connection/graphic user interface activation button.

7. The device of claim 6 wherein the automatic preconditioning connection device, the plurality of peripheral devices and the computer each include at least a first port that is universal serial bus compliant.

8. The device of claim 6 wherein the automatic peripheral connection/graphic user interface activation button automatically downloads predetermined voice recognition software/parameters to facilitate and optimize voice activation/control of an associated peripheral device.

9. A method for utilizing an automatic preconditioning connection device coupled to a plurality of peripheral devices and to a computer, for facilitating quick, optimized connection, with the computer, of a selected peripheral device from the plurality of peripheral devices, the method comprising the steps of:

A) using an automatic peripheral connection button to download, automatically, predetermined software/parameters to a programmable digital signal processor/processor of the automatic preconditioning connection device;

B) automatically optimizing and activating a microphone and plurality of speakers of the automatic preconditioning connection device and a graphic user interface of the computer.

10. The method of claim 9 wherein the automatic preconditioning connection device, the plurality of peripheral devices and the computer each include at least a first port that is universal serial bus compliant.

11. The method of claim 9 further including automatically downloading predetermined voice recognition software/parameters corresponding to a selected peripheral connection button to facilitate and optimize voice activation/control of an associated peripheral device.

* * * * *